United States Patent [19]

Lindsey

[11] Patent Number: 4,882,850
[45] Date of Patent: Nov. 28, 1989

[54] METHOD AND MEANS OF GENERATING DISTANCE MEASURING DATA AND RECORDING SAME

[76] Inventor: Warren M. Lindsey, 1120 Spring St., Apt. 603, Seattle, Wash. 98104

[21] Appl. No.: 268,706
[22] Filed: Nov. 8, 1988
[51] Int. Cl.⁴ ............................................. G01B 3/10
[52] U.S. Cl. ...................................... 33/760; 33/762
[58] Field of Search ............... 116/311, 312, 323, 324, 116/309, 321, 315, 316, 306, 307, 317, 318, 223, 231, 249, DIG. 1; 33/138, 139, 140, 760, 762, 768; 235/124

[56] References Cited

U.S. PATENT DOCUMENTS

| | | |
|---|---|---|
| D. 228,202 | 8/1973 | Quenot . |
| 602,053 | 4/1898 | Brodie ................................ 116/318 |
| 1,096,376 | 5/1914 | Kahanowicz ....................... 235/124 |
| 1,928,377 | 9/1933 | Hobbs . |
| 2,108,251 | 2/1938 | Clark . |
| 2,533,883 | 12/1950 | Gelb .................................... 116/318 |
| 2,842,877 | 7/1958 | Stevens .......................... 116/318 X |
| 3,838,520 | 10/1974 | Quenot . |
| 4,181,960 | 1/1980 | Tateishi . |
| 4,551,847 | 11/1985 | Caldwell . |
| 4,575,944 | 3/1986 | Lin . |

FOREIGN PATENT DOCUMENTS

| | | | |
|---|---|---|---|
| 178466 | 5/1954 | Austria ................................. 33/138 |
| 749993 | 5/1933 | France ................................. 235/124 |

Primary Examiner—Harry N. Haroian
Attorney, Agent, or Firm—Zarley, McKee, Thomte, Voorhees & Sease

[57] ABSTRACT

A measuring tape includes a distance recorder on the side of the tape body and is capable of recording information in feet, inches, and 1/16 inches. Three separate finger-controlled slide, indicator buttons are provided for each of the three distance scales. The slide indicators may be arranged linearly or concentrically.

13 Claims, 2 Drawing Sheets

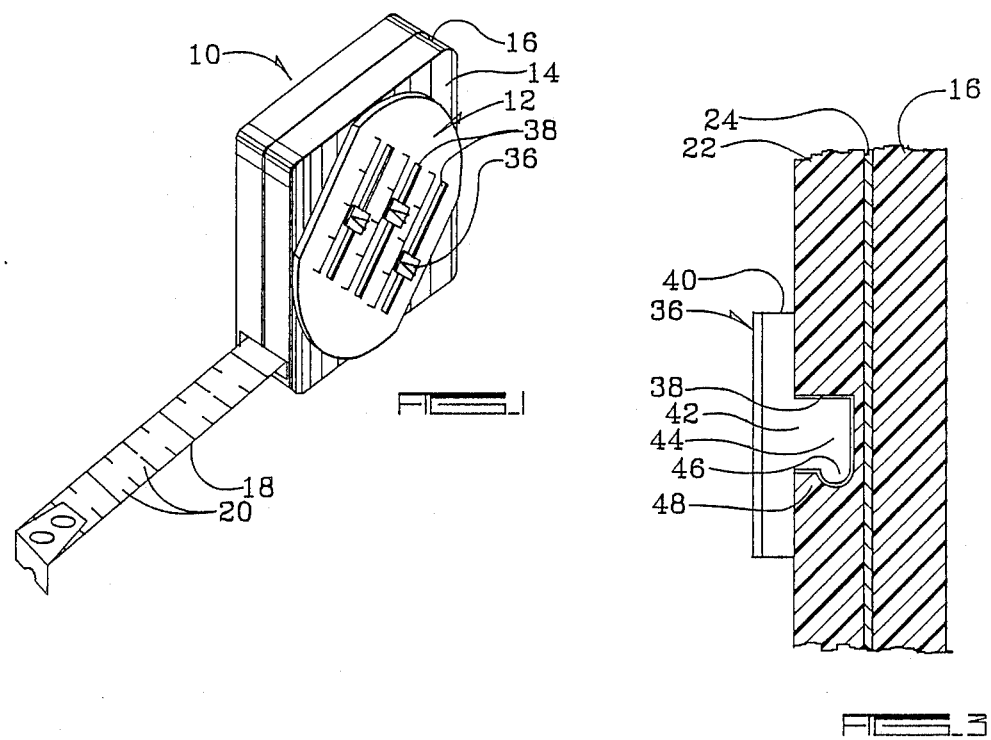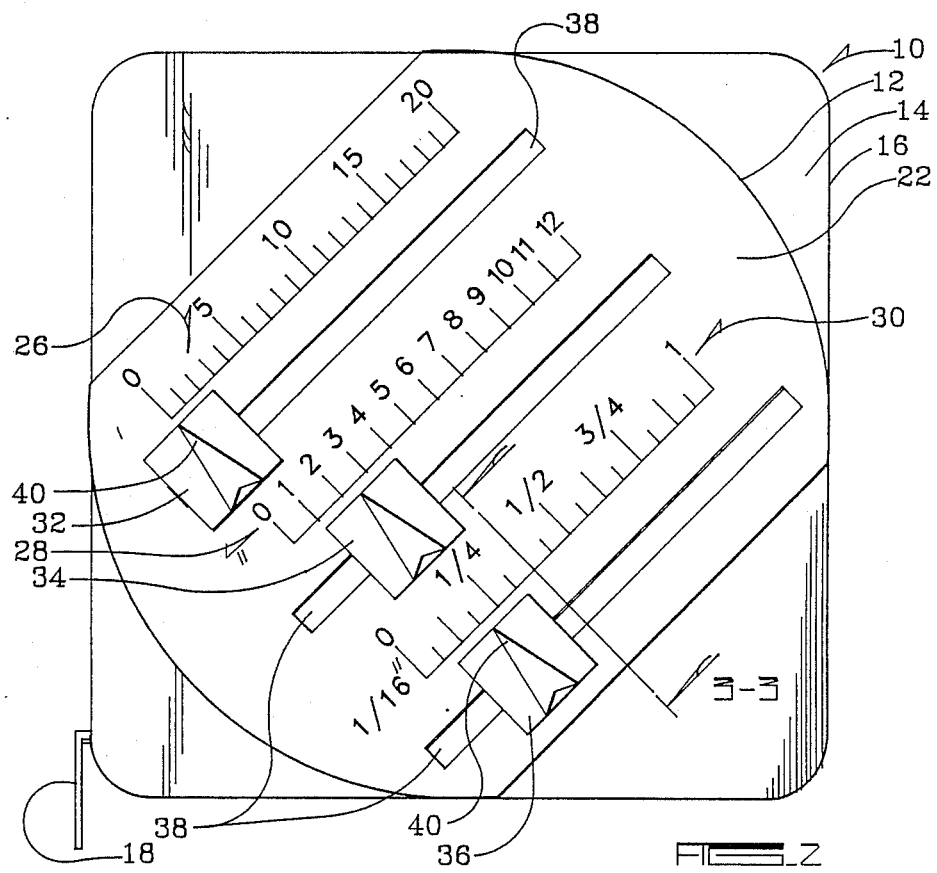

METHOD AND MEANS OF GENERATING DISTANCE MEASURING DATA AND RECORDING SAME

BACKGROUND OF THE INVENTION

When on a job site, a carpenter frequently needs to take measurements with a tape measure, but his hands are not free to write down what the measurement is, or there is no pencil, the lead is broken, or there is nothing to jot the figure down on. Preoccupied with other thoughts, the exact measurement is often forgotten by the time the carpenter has climbed down off the ladder, etc. and returned to the area where boards are cut.

Accordingly, what is needed is a self-contained distance recording device which is an integral part of the measuring tape and which requires no separate recording instruments, such as a pencil, to assure accuracy of the measured information which must be recorded contemporaneously with the making of the measurements because otherwise errors will occur and inaccuracy will be the result.

BRIEF DESCRIPTION OF THE INVENTION

A measured distance recorder is affixed to the side of the measuring tape body. The recorder includes three measuring scales in feet, inches, and 1/16 inch. Slide indicators move along each of these scales and are easily, manually operated while the user is taking the measurement, such as when he is on a ladder and inaccessible to paper and pencil. The slide indicators may move along linear measuring unit scales or be arranged concentrically allowing the indicators to be rotated.

BRIEF DESCRIPTION OF THE DRAWINGS

FIG. 1 is a perspective view of a tape measure with a distance recorder affixed to the side of the tape measure body.

FIG. 2 is an enlarged side elevational view showing the distance recorder.

FIG. 3 is a cross sectional view taken along line 3—3 in FIG. 2.

DESCRIPTION OF THE PREFERRED EMBODIMENT

Figure 4:
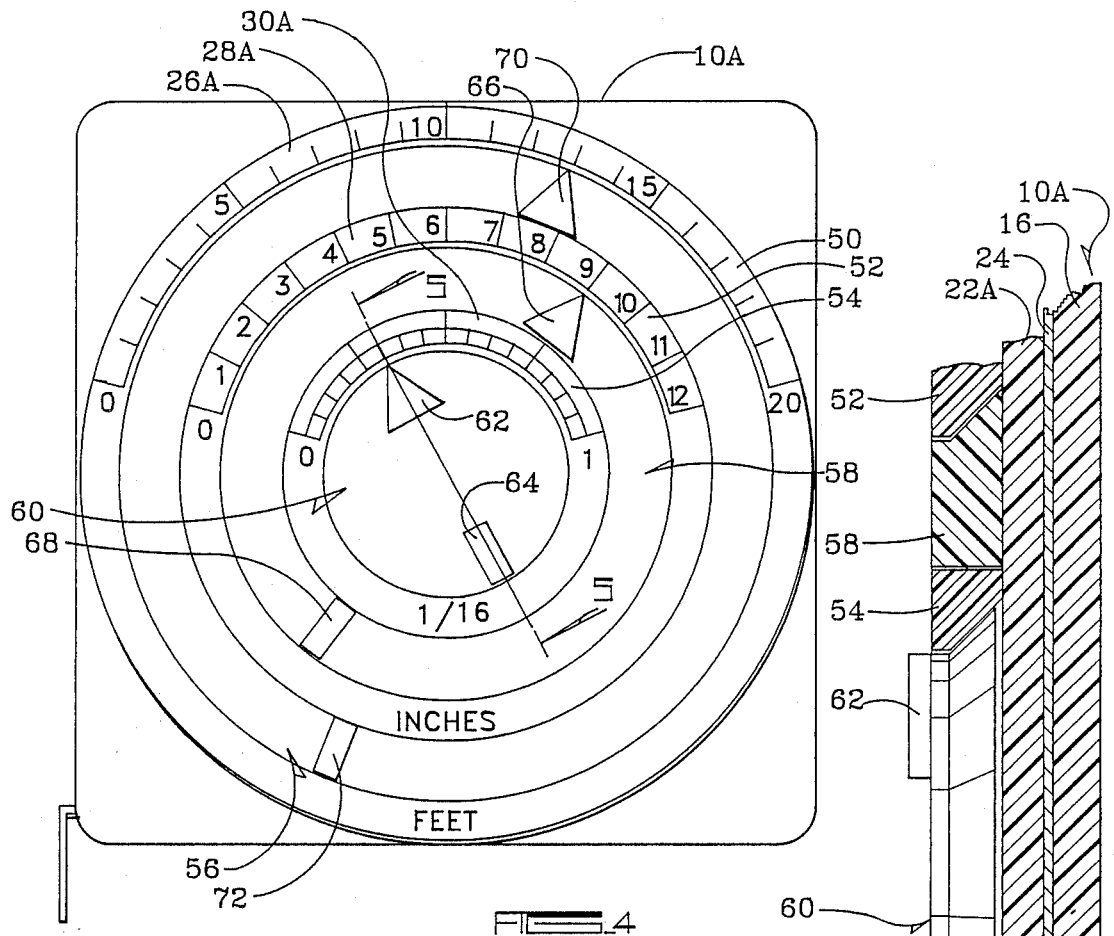
FIG. 4 is a side elevational view similar to FIG. 2, but showing an alternative embodiment employing concentric measuring unit scales and slide indicators.

The tape measure of this invention is referred to in FIG. 1 generally by the reference numeral 10 and includes a distance recorder 12 affixed to the side 14 of the tape measure body 16.

The tape measure 10 is conventional and includes a tape 18 having measured units scale 20 in feet, inches, and 1/16 of an inch.

As seen in FIG. 2, the distance recorder 12 includes a base plate 22 secured by adhesive 24 to the side 14 of the tape measure body 16. Three measuring units scales 26 for feet, 28 for inches, and 30 for 1/16 inches are provided. The scales are shown to be linear. The distance measuring unit scales include slidable finger-controlled indicator scales buttons 32, 34, and 36 movable in slots 38. As seen in FIG. 3, the slide indicator button 36 has an arrow head pointer top face 40 mounted on a shank 42 extending into the slot 38 and connected to a foot 44 having a toe 46 overwhich a shoulder 48 of the slot 38 is disposed.

It is thus seen in operation that the user would, in a typical situation, first go to the area to be measured by utilizing a ladder. The measurement is taken and then the user simply manipulates the finger-controlled slide indicator buttons 32, 34, and 36 opposite the feet, inches, and 1/16 of an inch measuring scales 26, 28, and 30 to record the precise measured information. The user then upon returning to the ground may record the information on paper or simply perform the cutting operations working from the data recorded on the distance recorder 12. It is seen that the chance of error has been minimized through the use of the distance recorder 12 on the side of the measuring tape 10.

Figure 5:
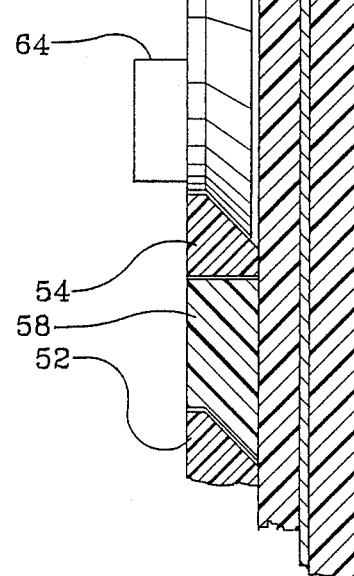
FIG. 5 is a cross sectional view taken along line 5—5 in FIG. 4.

An alternative embodiment of this invention is shown in FIGS. 4 and 5 and includes use of the measuring tape 10A which include a concentric recorder 12A on a base 22A as contrasted with the linear distance recorder 12 of FIGS. 1-3. The distance measuring units are displayed in feet on the scale 26A, inches on the scale 28A, and 1/16 inch on the scale 30A. The measuring unit scales are on stationary retainer rings 50, 52, and 54 respectively.

Finger-controlled slide indicator discs 56, 58, and 60 are concentrically arranged adjacent the distance measuring unit scales. The 1/16 of an inch disc 60 includes a two part indicator button having an arrow head 62 and tail 64. The disc 58 includes a button having a head 66 and tail 68, while the feet disc 56 has a head 70 and a tail 72. The head and tail portions of the indicator buttons are finger-controlled and may be easily rotated for positioning adjacent the desired measuring information on the stationary retainer rings, 50, 52, and 54.

In FIG. 5 it is seen that the stationary retainer rings 50, 52, and 54 and the indicator discs 56, 58 and 60 have complimentary beveled shoulders for retaining the rotatable indicator discs in place.

Thus it is seen that the concentric distance recorder 12A may be used in the same fashion as the linear distance recorder 12 of FIGS. 1-3. The distance shown on the recorder in FIG. 4 is 13 feet 9 5/16 inches.

I claim:

1. The method of generating distance measuring data and recording same comprising the steps of:
   providing a measuring tape having a housing on which a manually, operable slide indicator recorder is provided, said recorder including a slide indicator movable along a visable distance measuring unit scale registrable with said slide indicator to indicate a measured distance;
   extending the measuring tape over the area to be measured;
   reading the measuring tape for the measured distance data; and
   recording the measured distance data from the tape by moving the slide indicator opposite the corresponding measuring unit on the measuring units scale.

2. The method of claim 1 wherein the step of providing a measuring tape further includes the step of providing a second manually operable slide indicator and visable distance measuring units scale on said housing, and the step of recording the measured distance data further includes moving the second slide indicator opposite the corresponding measuring unit on the second measuring units scale to provide measured data in major and minor units of distance.

3. The method of claim 2 wherein the step of providing a measuring tape further includes the step of providing a third manually operable slide indicator and visable distance measuring units scale on said housing, and the step of recording the measured distance data further includes moving the third indicator opposite the corresponding measuring unit on the third measuring units scale to provide measured data in major, minor, and subminor units of distance.

4. The method of claim 3 wherein the steps of providing first, second and third measuring units scales further include providing said measuring scales in units of feet, inches, and 1/16 inches.

5. The method of claim 4 wherein the steps of providing first, second and third manually operable slide indicators and visable distance measuring units scales on said housing further includes the steps of arranging said measuring units scales in a linear format.

6. The method of claim 4 wherein the steps of providing first, second and third manually operable slide indicators and visable distance measuring units scales on said housing further includes the steps of arranging said measuring units scales in an accurate format.

7. The method of claim 4 wherein the steps of providing first, second and third manually operable slide indicators and visable distance measuring units scales on said housing further includes the steps of arranging said measuring units scales in an accurate format with said scales arranged concentrically.

8. A distance measuring tape and integral recording means comprising:
 a measuring tape having a housing and an extendable and retractable tape contained therein; and
 a slide indicator recorder provided on the outside of said housing including a slide indicator moveable along a distance measuring unit scale to record distances measured by said measuring tape.

9. The structure of claim 8 wherein said slide indicator recorder includes a second slide indicator moveable along a second distance measuring units scale to record distances measured by said measuring tape in major and minor units of distance.

10. The structure of claim 9 wherein said slide indicator recorder includes a third slide indicator moveable along a third distance measuring units scale to record measured distances in major, minor and subminor units of distance.

11. The structure of claim 10 wherein said first, second, and third measuring units scales are arranged in a linear format.

12. The structure of claim 10 wherein said first, second, and third measuring units scales are arranged in an accurate format.

13. The structure of claim 12 wherein said accurate format is further defined as being concentric.

* * * * *